F. M. ELLEDGE.
OYSTER SHIPPING PAIL.
APPLICATION FILED MAR. 15, 1911.
1,001,128.
Patented Aug. 22, 1911.
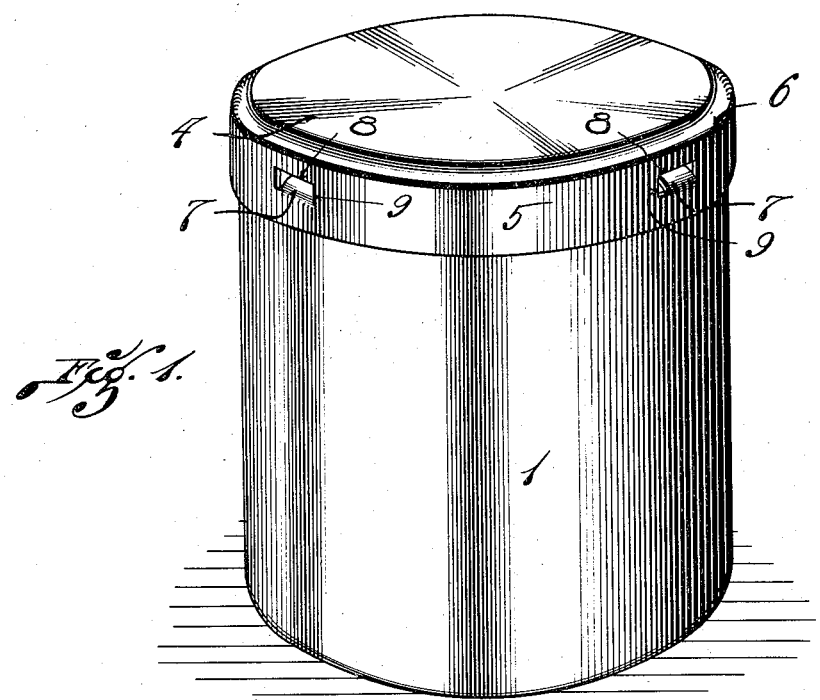
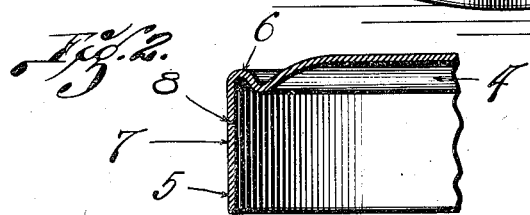
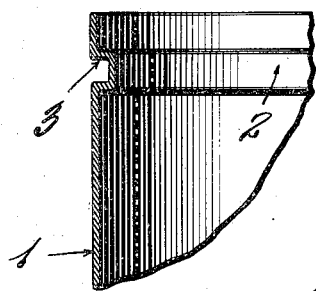
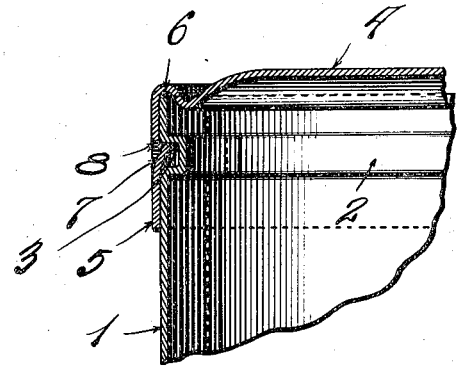
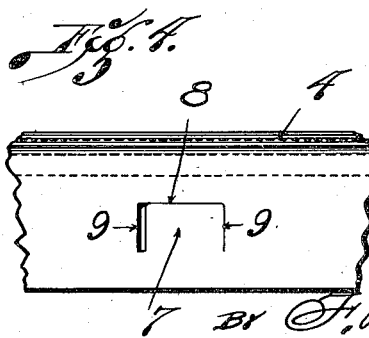
WITNESSES.
F. M. Harrington.
Wm. Janus.
INVENTOR.
Forrest M. Elledge.
By F. L. Cornwall, Atty.

UNITED STATES PATENT OFFICE

FORREST M. ELLEDGE, OF ST. LOUIS, MISSOURI.

OYSTER-SHIPPING PAIL.

1,001,128. Specification of Letters Patent. Patented Aug. 22, 1911.

Application filed March 15, 1911. Serial No. 614,744.

*To all whom it may concern:*

Be it known that I, FORREST M. ELLEDGE, a citizen of the United States, residing at St. Louis, Missouri, have invented a certain new and useful Improvement in Oyster-Shipping Pails, of which the following is a full, clear, and exact description, such as will enable others skilled in the art to which it appertains to make and use the same, reference being had to the accompanying drawings, forming part of this specification, in which—

Figure 1 is a perspective view of an oyster shipping pail or receptacle of my improved construction. Fig. 2 is a detail section showing a portion of the upper edge of the pail, and a portion of the lid or cover before the same is positioned upon the pail. Fig. 3 is a section of a portion of the upper edge of my improved pail and showing the lid or cover applied thereto. Fig. 4 is an illustration of a portion of the lid or cover.

My invention relates to a pail or can, particularly adapted to serve as a receptacle for the shipment of oysters and other sea foods from the sea coast to interior points, and the principal objects of my invention are to provide a simple receptacle of inexpensive construction so that it can be discarded after its contents have been removed, and to provide the receptacle with a cover or lid which can be easily applied to the receptacle, and which can be easily applied to and locked in position upon the receptacle, thereby preventing the loss of all or a part of the contents of the receptacle during shipping, by reason of the accidental displacement of the cover or lid from the receptacle.

A can of my improved construction is particularly adapted for use where oysters or like sea food is packed at points on the sea coast and shipped in refrigerated packages to interior points, and there reshipped or sold in the original packages.

Where pails or receptacles are shipped and reshipped after being packed, they are necessarily handled a number of times in being placed in or removed from cars, delivery wagons and the like, and unless the covers of the receptacles are locked or very tightly positioned on the receptacle there is danger of the covers becoming displaced, thereby incurring loss of a portion, if not all of the contents.

I propose to overcome the objections above noted by providing the shipping pails or receptacles with covers provided with means whereby they may be easily and quickly locked to the receptacles after being positioned thereon.

To the above purposes my invention consists in certain features of novelty herein after more fully described and claimed.

Referring by numerals to the accompanying drawings, 1 designates a receptacle in the form of an open topped can, preferably constructed of sheet metal and formed in the wall of said receptacle adjacent the upper edge thereof is an inwardly projecting bead 2. By the formation of this inwardly projecting bead, an inwardly projecting horizontally disposed shoulder 3 is formed usually around the body of the receptacle adjacent its upper edge.

The cover 4 for the receptacle is preferably constructed of sheet metal, and is of the usual form of a disk having a marginal depending flange 5 adapted to fit snugly over the upper portion of the receptacle 1. In the present instance the cover is formed at its outer edge with an annular bead 6 of inverted U-shape in cross section, and which bead receives the extreme upper edge of the wall of the receptacle 1, when the cover is properly positioned on said receptacle.

A series of locking lips 7 are formed in the depending flange 5 of the cover by the formation of short horizontally disposed slits 8, and the ends of which slits are extended downward as designated by 9. One of the slits 9, preferably on the left hand side of each lip is formed of sufficient width to permit the insertion of a pointed instrument utilized for bending the lips outward when the cover is disengaged from its locked position on the receptacle. These locking lips occupy the same vertical plane with the body of the wall or flange 5 before the cover is applied to the receptacle (see Fig. 2), and after the receptacle is packed or filled with oysters or other commodity being shipped, the cover is positioned on the upper end of said receptacle, and by an inward pressure of the thumb or a suitable implement the free upper portions of the lips 7 are bent inward into the groove formed by the inwardly projecting groove 2 with the upper edges of said lips in position immediately beneath the horizontally disposed or under cut shoulder 3; thus the cover is positioned on the receptacle and is locked thereon against accidental displacement during shipment.

To remove the cover from the receptacle, a thin instrument, such as a knife blade or the like, is inserted through the widened one of the slits 9 beneath the lip 7, and the same is pried or bent outwardly, thus disengaging the lip from the shoulder 3, after which the cover is free to be removed.

An oyster shipping pail of my improved construction is simple and inexpensive, and the cover for said receptacle can be easily and quickly locked against accidental displacement during the shipping or handling of the receptacle and its contents.

While I have described my improved receptacle as being particularly adapted for the shipping of oysters and like sea food it will be readily understood that the receptacle can be advantageously employed in the packing and shipping of liquid paint, preserved fruit, syrups and like commodities.

I claim:

1. The combination with a sheet metal receptacle having a groove formed in its outer surface adjacent its upper edge, of a sheet metal cover for the receptacle, a marginal flange depending from the cover, which marginal flange is provided with a series of substantially inverted U-shaped slots to form ductile lips adapted to be bent into the groove in the receptacle, and a portion of each of which slots to the side of the ductile lip is widened to receive the point of a lip unseating tool.

2. As a new article of manufacture, a friction top can cover formed of sheet metal, a depending flange integral with the edge of the section of metal forming the body of the cover, said flange being provided with a pair of vertical slots, and with a horizontally disposed slot uniting the upper ends of the vertical slots to form a ductile lip adapted to be bent inwardly to engage the body of the receptacle on which the cover is positioned, and one of which vertical slots is wider than the other and adapted to receive the point of a lip unseating tool.

In testimony whereof I hereunto affix my signature in the presence of two witnesses, this 10th day of March, 1911.

FORREST M. ELLEDGE.

Witnesses:
M. P. SMITH,
B. S. REID.